United States Patent
Monroe et al.

(10) Patent No.: US 7,028,498 B2
(45) Date of Patent: Apr. 18, 2006

(54) FOOD SERVING BAR

(75) Inventors: Daryl R. Monroe, Granite City, IL (US); Kim C. Fietsam, New Athens, IL (US); Paul S. Rusk, Ballwin, MO (US); Thomas E. Yingst, St. Louis, MO (US); Albert D. Smith, Sedalia, MO (US)

(73) Assignee: Duke Manufacturing Company, St. Louis, MO (US)

( * ) Notice: Subject to any disclaimer, the term of this patent is extended or adjusted under 35 U.S.C. 154(b) by 0 days.

(21) Appl. No.: 11/136,283

(22) Filed: May 24, 2005

(65) Prior Publication Data

US 2005/0217298 A1    Oct. 6, 2005

Related U.S. Application Data

(63) Continuation of application No. 10/847,430, filed on May 17, 2004, now Pat. No. 6,910,347, which is a continuation of application No. 10/266,428, filed on Oct. 8, 2002, now Pat. No. 6,735,971.

(51) Int. Cl.
*F25D 23/12* (2006.01)

(52) U.S. Cl. .......................................... 62/258; 62/446

(58) Field of Classification Search ................. 62/258, 62/382, 443, 446; 165/168
See application file for complete search history.

(56) References Cited

U.S. PATENT DOCUMENTS

| | | | |
|---|---|---|---|
| 1,831,861 A | 11/1931 | Henney | |
| 1,912,577 A | 6/1933 | Glass | |
| 2,305,319 A | 12/1942 | Pimie | |
| 2,360,074 A | 10/1944 | Robison | |
| 2,607,204 A | 8/1952 | Kleist | |
| 2,693,089 A | 11/1954 | Teeter | |
| 2,797,560 A | 7/1957 | Kooiker et al. | |
| 2,890,863 A | 6/1959 | Seal | |
| 2,893,805 A | 7/1959 | Ferguson | |
| 3,308,633 A | 3/1967 | Kritzer, Jr. | |

(Continued)

FOREIGN PATENT DOCUMENTS

GB    973994    11/1964

(Continued)

OTHER PUBLICATIONS

KAIRAK Innovations, Exhibit A—Pan Chiller System, drawn Feb. 7, 1994, submitted to Patent Office Mar. 9, 1994 during prosecution of U.S. Patent No. 5,355,687.

(Continued)

*Primary Examiner*—William E. Tapolcai
(74) *Attorney, Agent, or Firm*—Senniger Powers

(57) ABSTRACT

A temperature controlled food serving bar having a cabinet with an elongate opening. At least one divider of thermally conductive material extends the length of the elongate cabinet opening and divides the interior cabinet space into a plurality of elongate, pan-receiving cavities. The divider comprises a side wall and a bottom wall and at least one of the bottom wall and the side wall having a wall thickness between about 0.1 inch and about 0.2 inch. At least one food-holding pan received in one of the pan-receiving cavities has a bottom wall and side walls. At least one of the side walls of the at least one food-holding pan is spaced from the side wall of the divider between about 0.03 inch and about 0.15 inch. A temperature control system controls the temperature of the at least one divider.

39 Claims, 11 Drawing Sheets

U.S. PATENT DOCUMENTS

| | | |
|---|---|---|
| 3,388,561 A | 6/1968 | Parrott |
| 3,491,548 A | 1/1970 | Christiansen |
| 3,780,794 A | 12/1973 | Staub |
| 3,832,862 A | 9/1974 | Ingels |
| 3,952,794 A | 4/1976 | Spandoudis |
| 3,971,231 A | 7/1976 | Derry |
| 4,210,675 A | 7/1980 | Liebermann |
| 4,213,498 A | 7/1980 | Vandenbossche |
| 4,407,143 A | 10/1983 | Wolfe |
| 4,593,752 A | 6/1986 | Tipton |
| 4,615,183 A | 10/1986 | Juncos et al. |
| 4,782,665 A | 11/1988 | Wolfe |
| 4,802,340 A | 2/1989 | Johnson |
| 4,852,741 A | 8/1989 | Van Benschoten |
| 4,856,579 A | 8/1989 | Wolfe |
| 4,870,835 A | 10/1989 | Wolfe et al. |
| 5,010,741 A | 4/1991 | Gelatini |
| 5,117,649 A | 6/1992 | Mangini et al. |
| 5,168,719 A | 12/1992 | Branz et al. |
| 5,247,807 A | 9/1993 | Jarman et al. |
| 5,355,687 A | 10/1994 | Carpenter et al. |
| 5,363,672 A | 11/1994 | Moore et al. |
| 5,388,429 A | 2/1995 | Shackelford et al. |
| 5,404,935 A | 4/1995 | Liebermann |
| 5,551,774 A | 9/1996 | Campbell et al. |
| 5,927,092 A | 7/1999 | Kushen et al. |
| 6,000,236 A | 12/1999 | Haasis |
| 6,085,535 A | 7/2000 | Richmond et al. |
| 6,145,333 A | 11/2000 | Richmond et al. |
| 6,151,905 A | 11/2000 | Smith |
| 6,202,432 B1 | 3/2001 | Haasis |
| 6,385,990 B1 | 5/2002 | Lee |
| 6,434,961 B1 | 8/2002 | Richmond et al. |
| 6,910,347 B1 | 6/2005 | Monroe et al. |

FOREIGN PATENT DOCUMENTS

| | | |
|---|---|---|
| GB | 2152648 | 8/1985 |

OTHER PUBLICATIONS

KAIRAK Innovations, Declaration of Jeff Hatch Including Exhibit A-A- Pan Chiller System, Declaration signed on May 27, 1994, Exhibit A-A drawn May 23, 1994, submitted to Patent Office Jun. 2, 1994 during prosecution of U.S. Patent No. 5,355,687.

FOOD SERVING BAR

CROSS-REFERENCE TO RELATED APPLICATIONS

This application is a continuation of U.S. patent application Ser. No. 10/847,430, filed May 17, 2004 now U.S. Pat. No. 6,910,347 which is a continuation of U.S. application Ser. No. 10/266,428 filed Oct. 8, 2002 now U.S. Pat. No. 6,735,971. The entire text of both of the above-referenced applications is hereby incorporated herein by reference.

BACKGROUND OF THE INVENTION

The present invention relates generally to the food service industry, and more particularly to food serving bars which are temperature controlled to maintain food at a suitable temperature as it is being served.

This invention is generally in the same field as U.S. Pat. Nos. 4,407,143, 4,782,665, 4,856,579 and 4,870,835, owned by Duke Manufacturing Company, disclosing refrigerated food serving equipment known as frost top units which give the appearance that the food products being served are resting in ice. U.S. Pat. Nos. 5,355,687 and 5,927,092 disclose other types of refrigerated units for holding food pans.

SUMMARY OF THE INVENTION

Among the several objects of this invention will be noted the provision of a food serving bar which is equipped for holding a number of relatively small (e.g., 6.9 in. wide by 12.8 in. long) food pans in parallel rows; the provision of such a serving bar which efficiently cools and/or heats the food in all such pans substantially uniformly; the provision of such a serving bar which is economical to manufacture and attractive in appearance; and the provision of such a serving bar which can easily retrofit a conventional frost top unit.

In one aspect, the present invention is directed to a temperature controlled food serving bar comprising a cabinet having opposite sides and opposite ends defining an interior cabinet space, and a top wall with an elongate opening therein above the interior cabinet space. At least one divider of thermally conductive material extends the length of the elongate cabinet opening and divides the interior cabinet space into a plurality of elongate, pan-receiving cavities each of which extends lengthwise of the cabinet opening to allow placement of at least one food-holding pan in the cavity at any desired location along the cavity. The divider comprises a side wall and a bottom wall and at least one of the bottom wall and the side wall having a wall thickness between about 0.1 inch and about 0.2 inch. At least one food-holding pan received in one of the pan-receiving cavities has a bottom wall and side walls. At least one of the side walls of the at least one food-holding pan is spaced from the side wall of the divider between about 0.03 inch and about 0.15 inch. A temperature control system controls the temperature of the at least one divider.

In another aspect of the invention, a temperature-controlled food serving bar comprises a cabinet having opposite sides and opposite ends defining an interior cabinet space, a top wall, and an elongate opening in the top wall above the interior cabinet space. At least one channel of thermally conductive material extends the length of the elongate cabinet opening and divides the interior cabinet space into a plurality of elongate, pan-receiving cavities each of which extends lengthwise of the cabinet opening to allow placement of at least one food-holding pan in the cavity at any desired location along the cavity. The channel has opposing side walls and a bottom wall and at least one of the bottom wall and the side walls having a wall thickness between about 0.1 inch and about 0.2 inch. A liner has side walls extending down from the top wall of the cabinet and a bottom wall. The bottom wall of the at least one channel is spaced above the bottom wall of the liner to form an interior space. A plurality of food-holding pans are received in one of said pan-receiving cavities. At least one of the pans has a bottom wall, side walls, and a width of approximately 6.9 inches. The side walls of the at least one of the food-holding pans is spaced from a respective side wall of the channel between about 0.03 inch and about 0.15 inch. A temperature control system heats the at least one channel.

In yet another aspect, the present invention is generally directed to a retrofit kit for installation on an existing food serving bar cabinet having a top wall with an opening allowing access to an interior space of the cabinet. The retrofit kit comprises at least one divider of thermally conductive material for placement in or below the opening to extend lengthwise of the cabinet opening. The divider has opposed side walls for extending down into said interior space and a bottom wall to divide said interior space into a plurality of elongate pan-receiving cavities each of which extends lengthwise of the cabinet opening to allow placement of multiple food-holding pans in the cavity at any desired location along the cavity. At least one of the side walls and bottom wall has a wall thickness between about 0.1 inch and about 0.2 inch. At least one food-holding pan is received in one of the pan-receiving cavities. The pan having a bottom wall and side walls. At least one of the side walls of the at least one food-holding pan is spaced from the side wall of the divider between about 0.03 inch and about 0.15 inch. A temperature control system controls the temperature of the at least one divider.

Other objects and features will be in part apparent and in part pointed out hereinafter.

BRIEF DESCRIPTION OF THE DRAWINGS

Corresponding parts are designated by corresponding reference numbers throughout the drawings.

DESCRIPTION OF PREFERRED EMBODIMENTS

Figure 1:
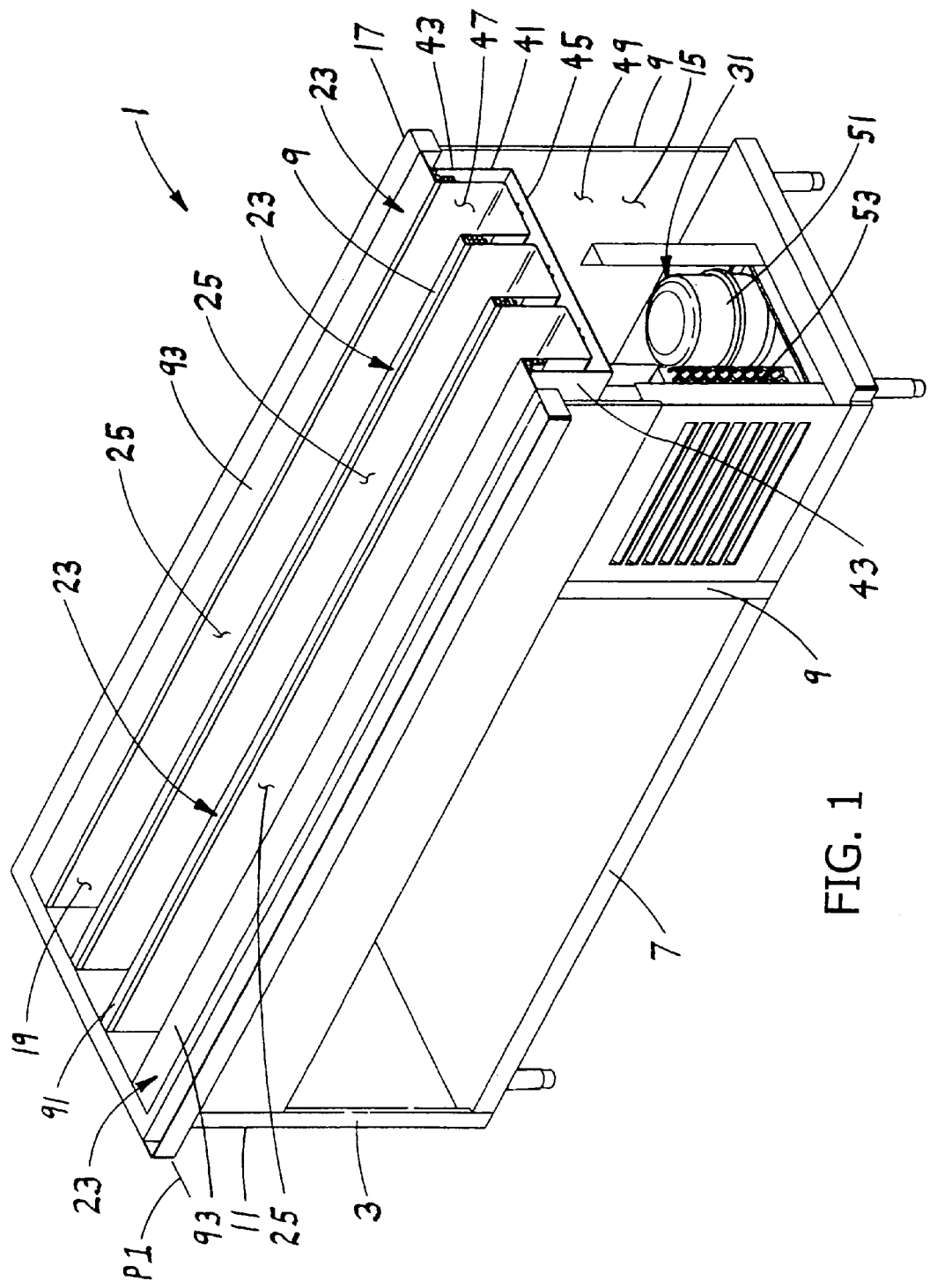
FIG. 1 is a perspective of a first embodiment of a food serving bar of the present invention.

Referring to the drawings, and first and more particularly to FIG. 1, a food serving bar of the present invention is designated in its entirety by the reference numeral 1. The bar 1 comprises a base 3 in the form of a cabinet having a bottom wall 7, side walls 9 and end walls 11 defining an interior space 15. A top wall 17 overlies the interior space 15 and has an opening 19 therein, preferably but not necessarily elongate, above the interior space. In the illustrated embodiment of FIG. 1, one of the end walls 11 and a portion of one of the side walls 9 have been removed to more clearly illustrate the interior space 15. A plurality of elongate generally parallel dividers, each generally designated 23, of thermally conductive material (e.g., extruded aluminum) extend lengthwise of the cabinet 3 in the interior space 15 below the opening 19 in the top wall 17. The dividers 23 define a plurality of elongate generally parallel pan-receiving cavities 25 for receiving generally parallel rows of food-holding pans 27 extending lengthwise of the base 3 in the interior space 15, one such pan being shown in FIG. 2. The bar 1 also includes a temperature control system 31 comprising, in the preferred embodiment, a plurality of heat transfer lines 33 for heating or cooling the dividers 23 and the pans 27 received in the cavities 25, as will be described in more detail hereinafter. In the embodiments described below, the temperature control system 31 is a refrigeration system for cooling the dividers 23 and pans 27, but it will be understood that the temperature control system could also be operable to heat the dividers and pans.

Referring to FIGS. 1–5, the food serving bar 1 includes a pan-shaped liner 41 fabricated of sheet metal, for example, suitably secured (e.g., welded) to the top wall 17 of the cabinet 3. The liner 41 has side walls 43 extending down from the top wall 17 and a bottom wall 45 spaced below the opening 19 in the top wall 17 and below the dividers 23. The liner 41 divides the interior space 15 of the cabinet 3 into an upper section 47 inside the liner and a lower section 49 below the liner. A compressor 51 and evaporator 53 of the aforementioned refrigeration system 31 are located in the lower section 49 for cooling the lower part of the cabinet 3 in conventional fashion. The refrigeration lines 33 for cooling the dividers 23 are connected to the compressor 51 by quick-connect/disconnect mechanisms, soldering or other suitable means (not shown).

In the embodiment shown in FIGS. 1–5, each divider 23 comprises a channel 61 having a bottom wall 63 and side walls 65 extending up from the bottom wall to define one of the pan-receiving cavities 25. Three such channels 61 are shown, but this number can vary (e.g., two, four or more than four). The channels 61 can be fabricated of stamped sheet metal, or extruded or cast of thermally conductive material (e.g., aluminum or stainless steel). Further, each channel 61 can be an assembly of such parts, or a single extrusion or casting. The channels 61 can be formed separate from one another, or as a unitary structure. In a preferred embodiment, each channel 61 is of extruded aluminum having a wall thickness in the range of from about 0.1 in. to about 0.2 in. The parallel channels 61 are spaced apart a suitable distance (e.g., 1.1 in.) to form inner substantially vertical interior spaces 67 between adjacent side walls 65 of adjacent channels. Further, the sides 43 of the liner 41 are spaced from the outer side walls 65 of the two outside channels 61 to form outer substantially vertical interior spaces 71. The liner 41 is spaced below the bottom walls 63 of the channels 61 to define a generally horizontal interior space indicated at 73.

Figure 2:
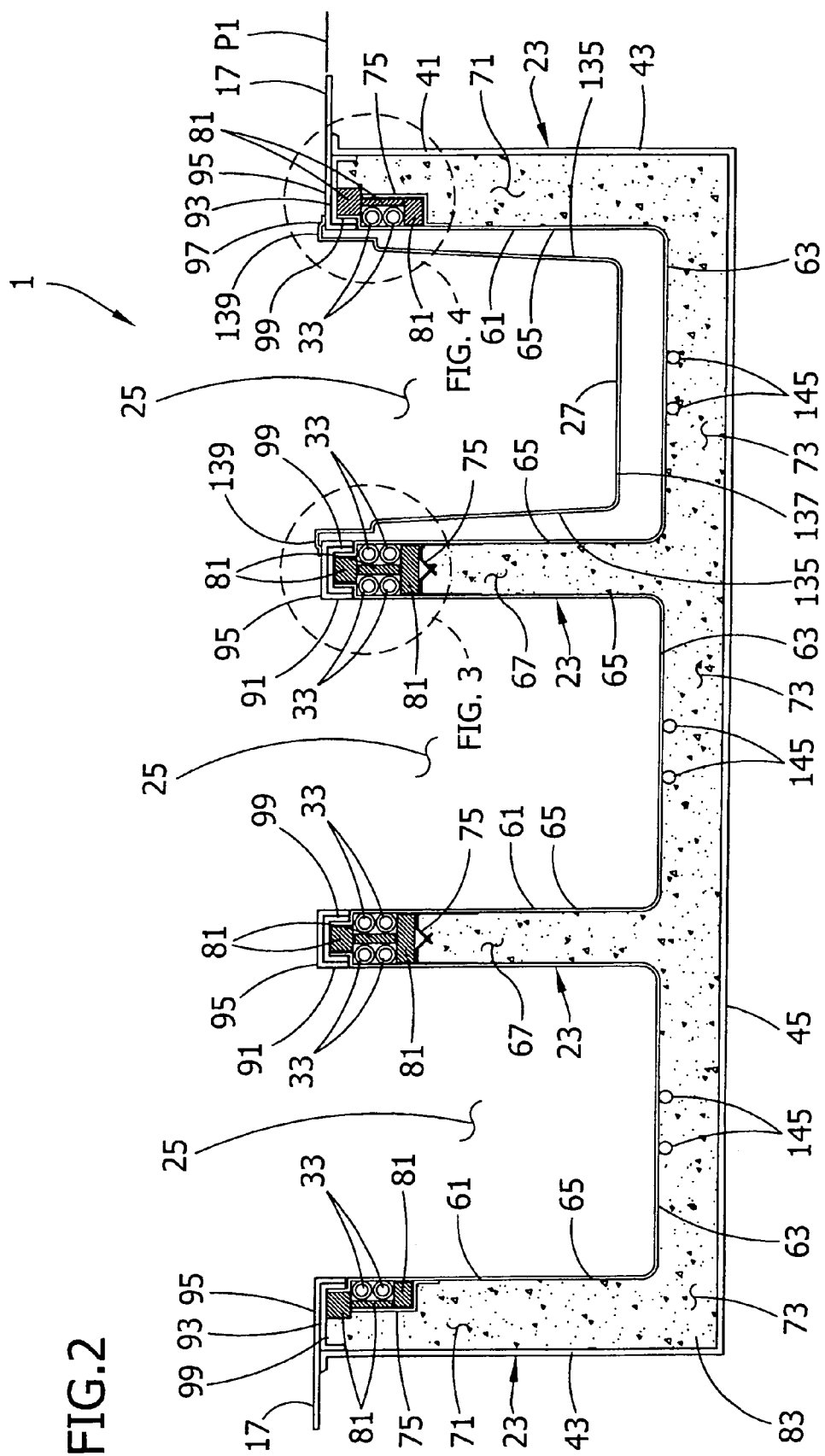
FIG. 2 is a sectional view showing a plurality of dividers and cavities in the food serving bar, and a food pan in one of the cavities.
Figure 3:
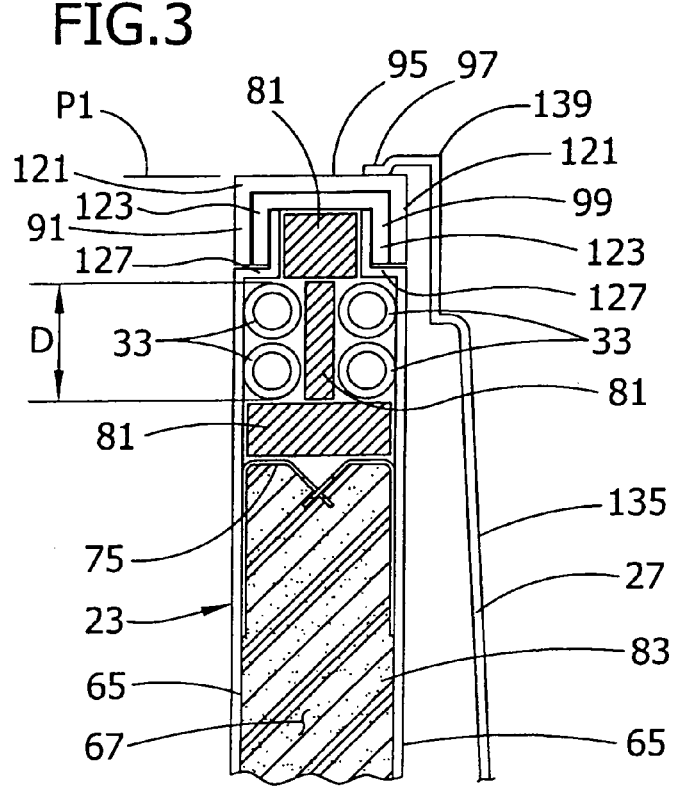
FIG. 3 is an enlarged portion of FIG. 2 showing an inner substantially vertical interior space of the food serving bar.
Figure 4:
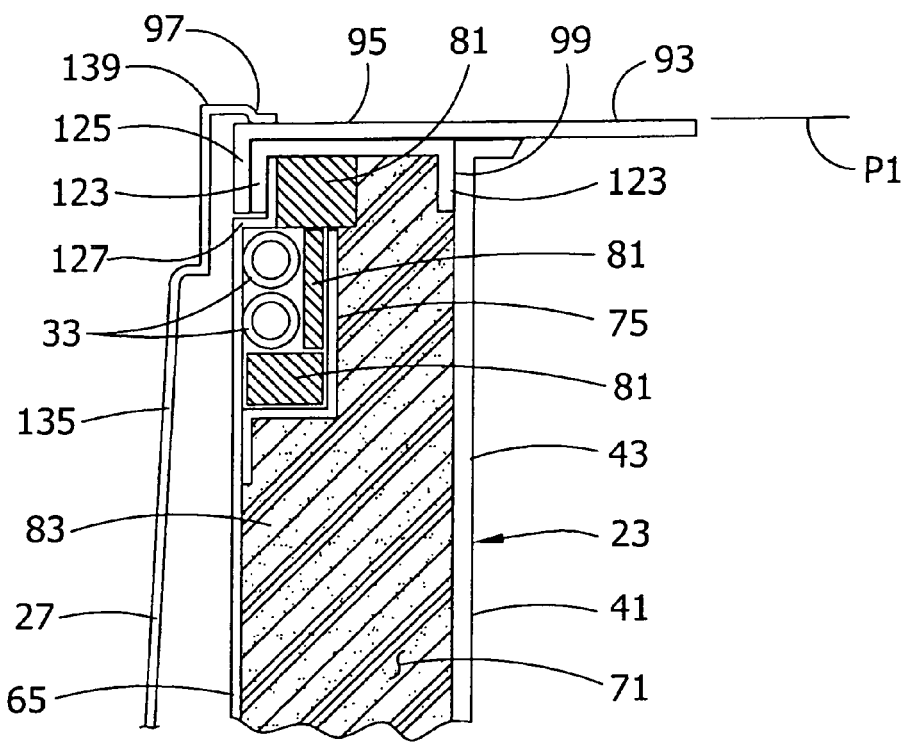
FIG. 4 is an enlarged portion of FIG. 2 showing an outer substantially vertical interior space of the food serving bar.
Figure 5:
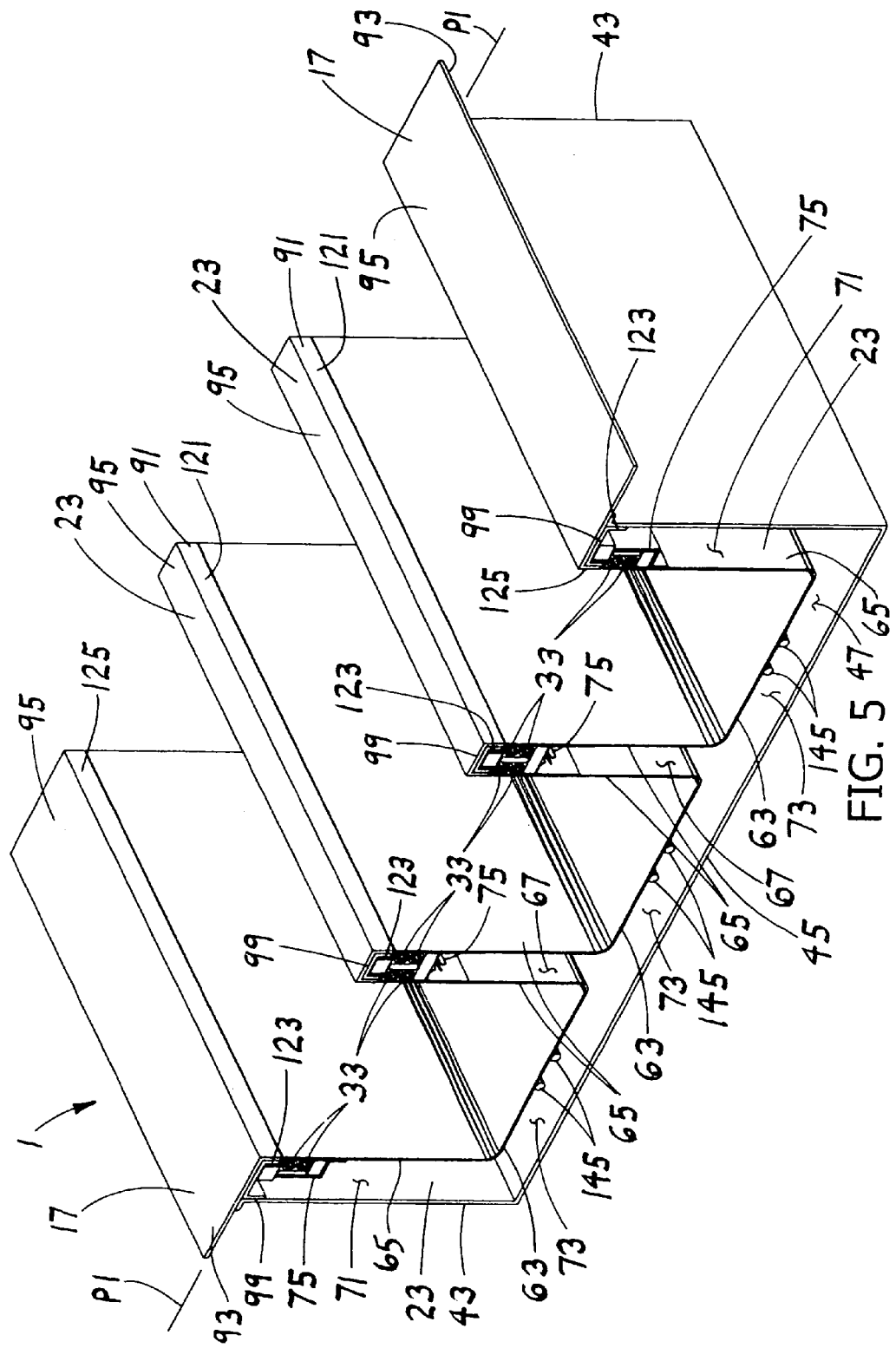
FIG. 5 is a detail cut-away of a portion of the food serving bar of FIG. 1.

The heat transfer lines 33 are located in the inner and outer vertical spaces, 67 and 71 respectively, alongside the side walls 65 of the channels 61, preferably adjacent the upper ends of the side walls for cooling (or heating) the upper side portions of the pans 27 disposed in the channels. The heat transfer lines 33 may comprise lengths of copper tubing running the lengths of the channels 61 for carrying a suitable heat transfer medium (e.g., coolant). To insure good heat transfer between the lines 33 and the channel walls 65, the lines are preferably secured so that they are in direct contact with the walls, as by brackets 75 attached (e.g., welded) to the walls 65 at suitable intervals along the walls. The required size and configuration of lines 33 will depend on the size of the pans 27, the desired temperature at which the food in the pans is to be maintained, the amount and type of food being maintained, and other factors apparent to those skilled in this field. As shown in FIG. 2, two runs of lines 33 (upper and lower) are provided along the upper portion of each side wall 65 of each channel 61, the runs being stacked relatively closely one above the other. In the illustrated embodiment of FIGS. 1–5, the heat transfer lines 33 are substantially parallel with the channels 61 extending the length of the food bar 1 thus eliminating the need for heat transfer lines that extend transversely across the channels 61 at locations between adjacent pans 27 in the cavities 25. By way of example, but not limitation, the lines 33 may be ⅜ in. OD copper tubing, with the centers of the runs being spaced about 0.6 in. apart, and the overall vertical distance D (FIG. 3) being about 1.0 in. It will be understood that more or less than two lines 33 can be used to cool or heat each wall 65 (which is thus referred to as a temperature-controlled wall). The lines 33 may be formed as a single serpentine coil, as shown in FIGS. 1–5, or as a number (e.g., three) of separate coils connected together. In any event, the interior spaces 67 and 71 between the liner 41 and the channels 61 are preferably substantially filled with thermal insulation. As shown in FIG. 2, this insulation comprises, in one embodiment, strips of thermal insulation 81 surrounding the heat transfer lines 33 on all sides except the sides immediately adjacent the heat transfer walls 65 of the channels 61. A foam-type insulation 83 fills the vertical spaces 67 and 71 not occupied by the strips 81 as well as the horizontal interior space 73 between the channels 61 and the liner 41. The strips of insulation 81 may be polystyrene, for example, and the foam-type insulation 83 may be polyurethane. Other types of insulation may be used to maximize the efficiency of heat transfer between the lines 33 and the channels 61.

In the embodiment of FIGS. 1–5, the side walls 65 of adjacent channels 61 are bridged by caps 91 of a wear resistant material (e.g., stainless steel) overlying the inner substantially vertical interior spaces 67 between the channels. The caps 91 may be secured in place by tack welding, adhesive or other suitable means. Preferably, the caps 91 are removable so that they can be replaced if damaged or as they become worn. Extensions 93 of the top wall 17 of the cabinet 3 overlie the outer substantially vertical interior spaces 71 between the liner 41 and the outer two channels 61 along opposite sides of the opening 19. These caps 91 and extensions 93 have upward facing surfaces 95 which lie substantially in the plane P1 of the top wall 17 of the cabinet 3 and support the peripheral lips 97 of the food-holding pans 27 to support the pans in respective cavities 25, one such pan being shown in FIG. 2. Thermal barriers 99 are provided below the caps 91 and the top wall extensions 93 to prevent frosting (or overheating) of these areas. The thermal barriers 99 may be of a suitable heat insulating material, such as polycarbonate. The caps 91, thermal barriers 99 and top wall extensions 93 have vertical flanges, 121, 123 and 125 respectively, which mate against horizontal shoulders 127 formed in the upper ends of the side walls 65 of the channels 61 to form relatively smooth flat continuous junctions between the channel side walls and the caps and between the channel side walls and the top wall extensions to facilitate maintenance and to provide a clean attractive appearance (see FIGS. 3 and 4). In one embodiment, the top heat transfer line 33 along each channel side wall 65 is positioned closely adjacent (preferably touching) a respective horizontal shoulder 127.

Referring to FIG. 2, each channel 61 preferably has a width between the side walls 65 not substantially greater than the width of a pan 27 received in the cavity 25 defined by the channel, so that the sides 135 of the pan are spaced relatively close (e.g., in range of from about 0.03 to 0.15 in.) to the temperature-controlled side walls of the channel. This will insure good heat transfer between the channel 61 and the pan 27. Typically, the sides 135 of the pan 27 are tapered, with the bottom 137 of the pan being somewhat narrower than the top 139 of the pan. Thus, when the pan 27 is positioned in a channel 61, as shown in FIG. 2, the top 139 of the pan will be closest to the substantially vertical side walls 65 of the channel where the heat transfer lines 33 are located for efficient cooling (or heating) of the pans. Preferably, the depth of the channels 61 should be such that there is about 0.5 in. between the bottom wall 63 of the channel and the bottoms 137 of the pans 27. A relatively small spacing is advantageous to maintain in that a smaller cavity between the channels 61 and the pans 27 can be cooled (or heated) more efficiently. The length of the channels 61 will vary, depending on the dimensions of the opening 19 in the top wall 17 of the cabinet 3, but typically will be in the range of from about 54 in. to about 82 in.

While the heat transfer lines 33 described-above are preferably standard copper tubing, it is contemplated that other types of thermal fluid lines may be used. For example, aluminum microchannel extrusions of the type commercially available from Thermalex, Inc. of Montgomery, Ala. may also be suitable. Further, the channel walls 65 can be heated or cooled by other mechanisms, such as by a forced air system in which temperature controlled air is circulated between the channels to heat or cool them, or an air impingement system of the type developed by Enersyst Development Center in which jets of high pressure, high velocity, temperature controlled air are directed onto the walls of the channels. The use of a bath system in which the channels 61 are immersed in a thermal fluid is also contemplated.

To prevent over-cooling of the pans and their contents in a situation where the food serving bar is refrigerated, heating elements 145 may be provided along the bottom wall 63 of each channel 61, as shown in FIG. 2. The heating elements 145 may be electric resistance heating elements, for example. Temperature sensors (not shown) may be used to sense the temperatures of the pans 27 and/or channels 61, and to signal the operation of the appropriate heating elements 145 if and when needed.

Figure 6:
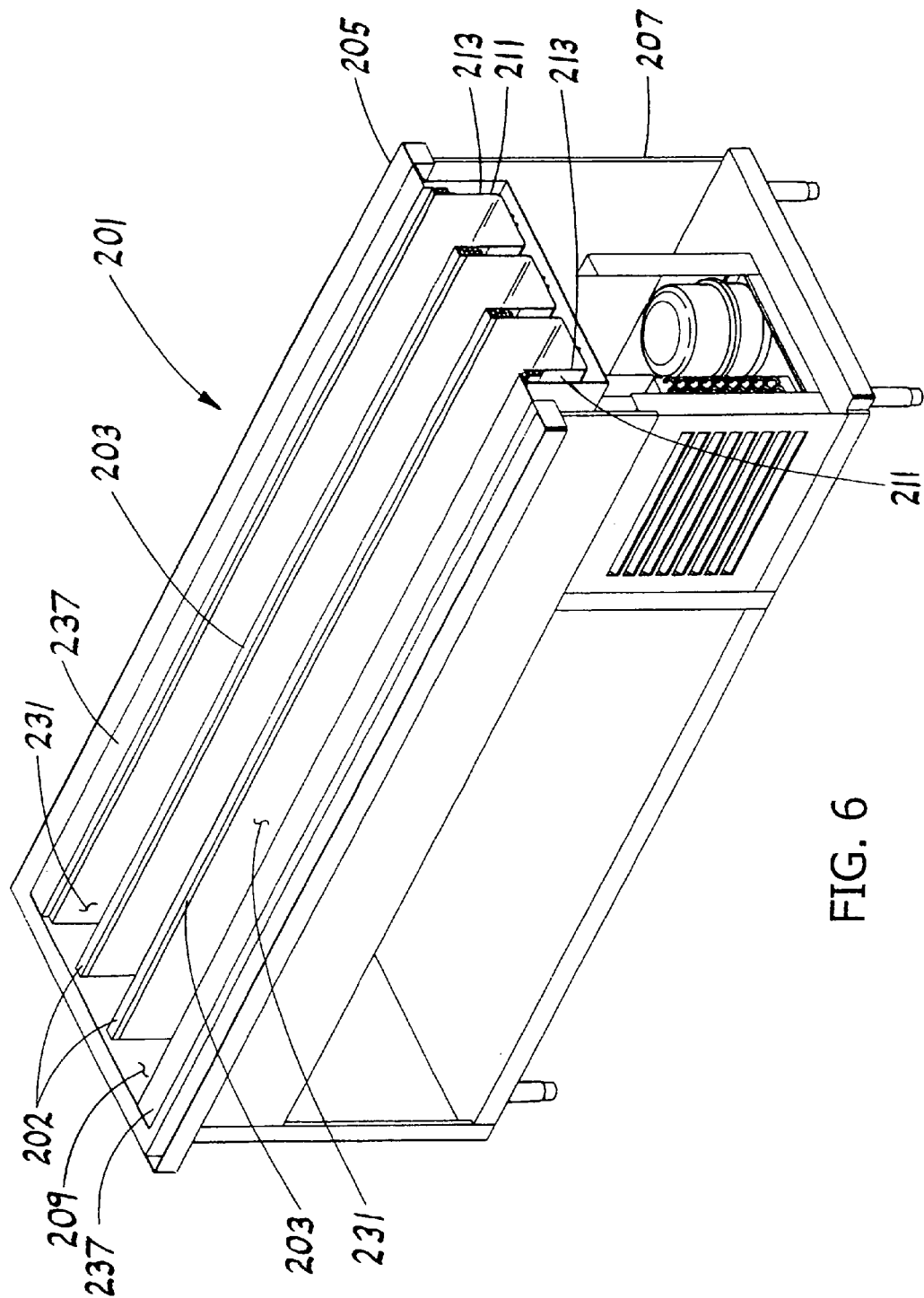
FIG. 6 is a perspective of a second embodiment of a food serving bar of the present invention.
Figure 7:
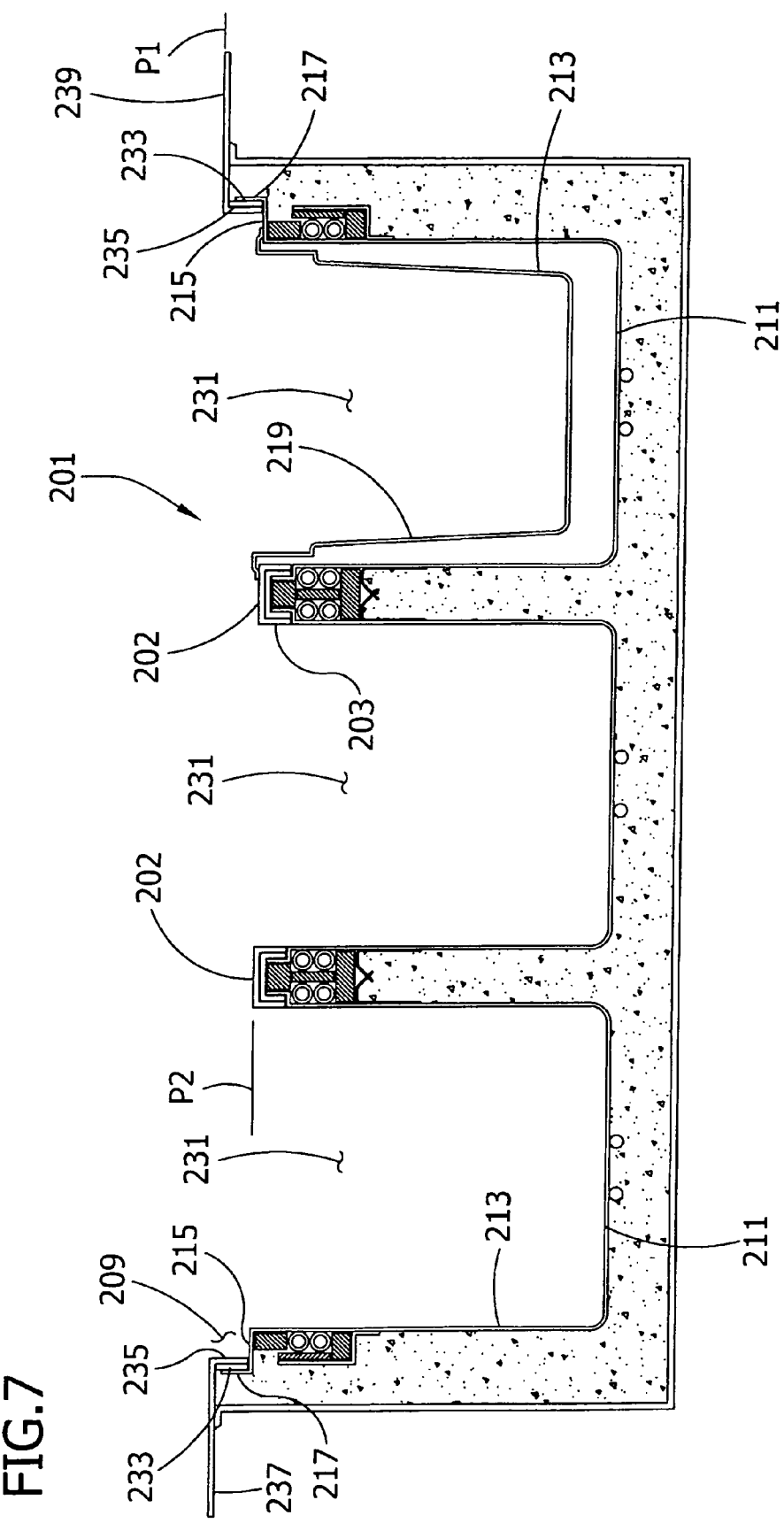
FIG. 7 is a sectional view showing a plurality of dividers and cavities in the food serving bar of FIG. 6, and a food pan in one of the cavities.
Figure 8:
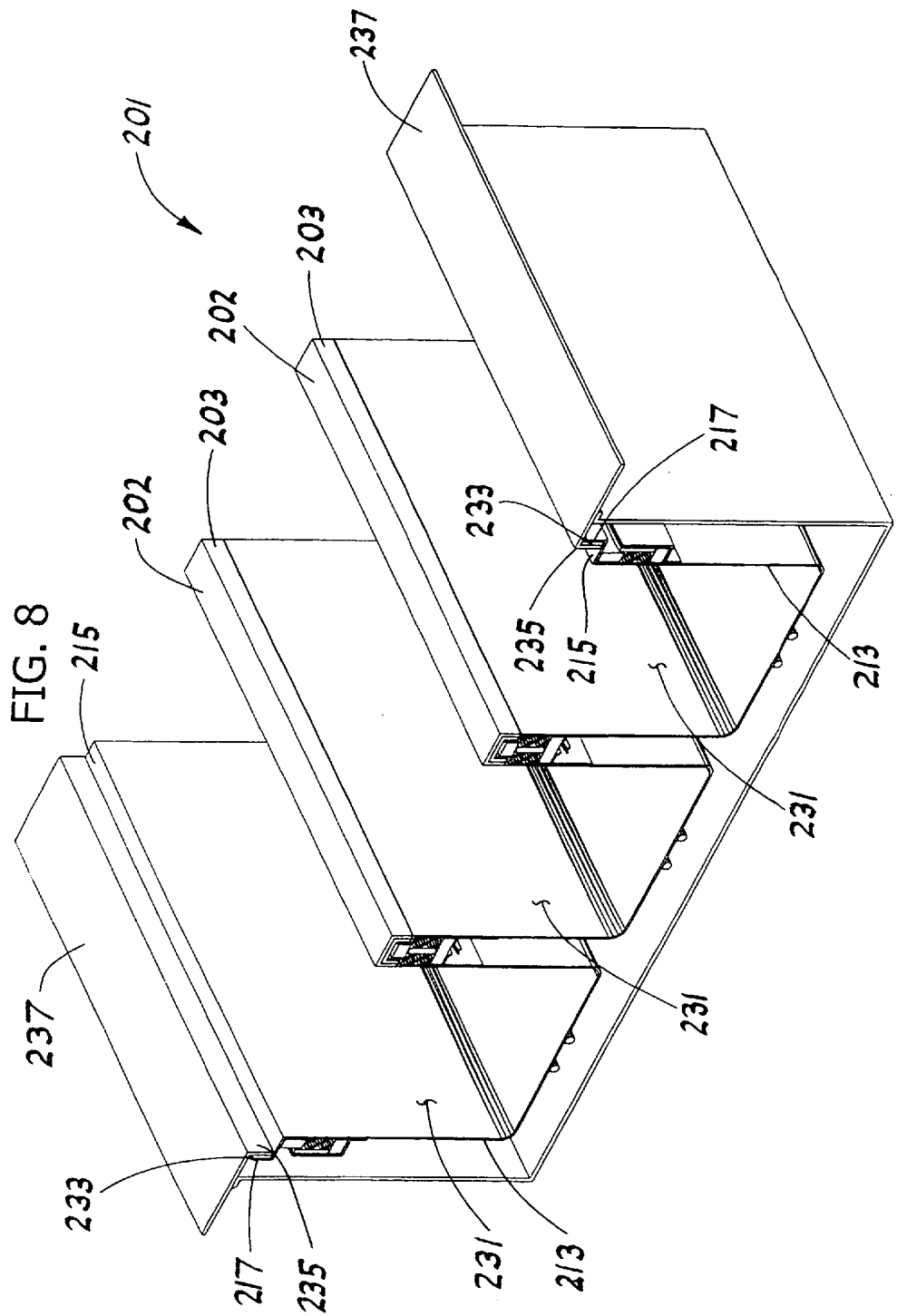
FIG. 8 is a detail cut-away of a portion of the food serving bar of FIG. 6.

FIGS. 6–8 illustrate a second embodiment of a food server of the present invention, generally designated 201. This embodiment is substantially identical to the first embodiment, except that the upward facing surfaces 202 of the pan-supporting caps 203 are disposed in a plane P2 recessed below the plane P1 of the top wall 205 of the cabinet 207. The two outside channels 211 (i.e., the channels adjacent the elongate side edges of the opening 209 in the top wall 205 of the cabinet 207) have outer-side walls 213 formed with generally horizontal shoulders 215 and upturned lips 217 at the outer ends of the shoulders. The shoulders 215 are generally coplanar with the upward facing surfaces 202 of the pan-supporting caps 203 to support the pans 219 in the cavities 231 defined by these two channels 211. Thermal barriers 233 are positioned between the upturned lips 217, extending up from the shoulders 215, and the downturned lips 235 of the top wall extensions 237 to prevent frosting of the top wall 205 of the cabinet 207.

Figure 9:
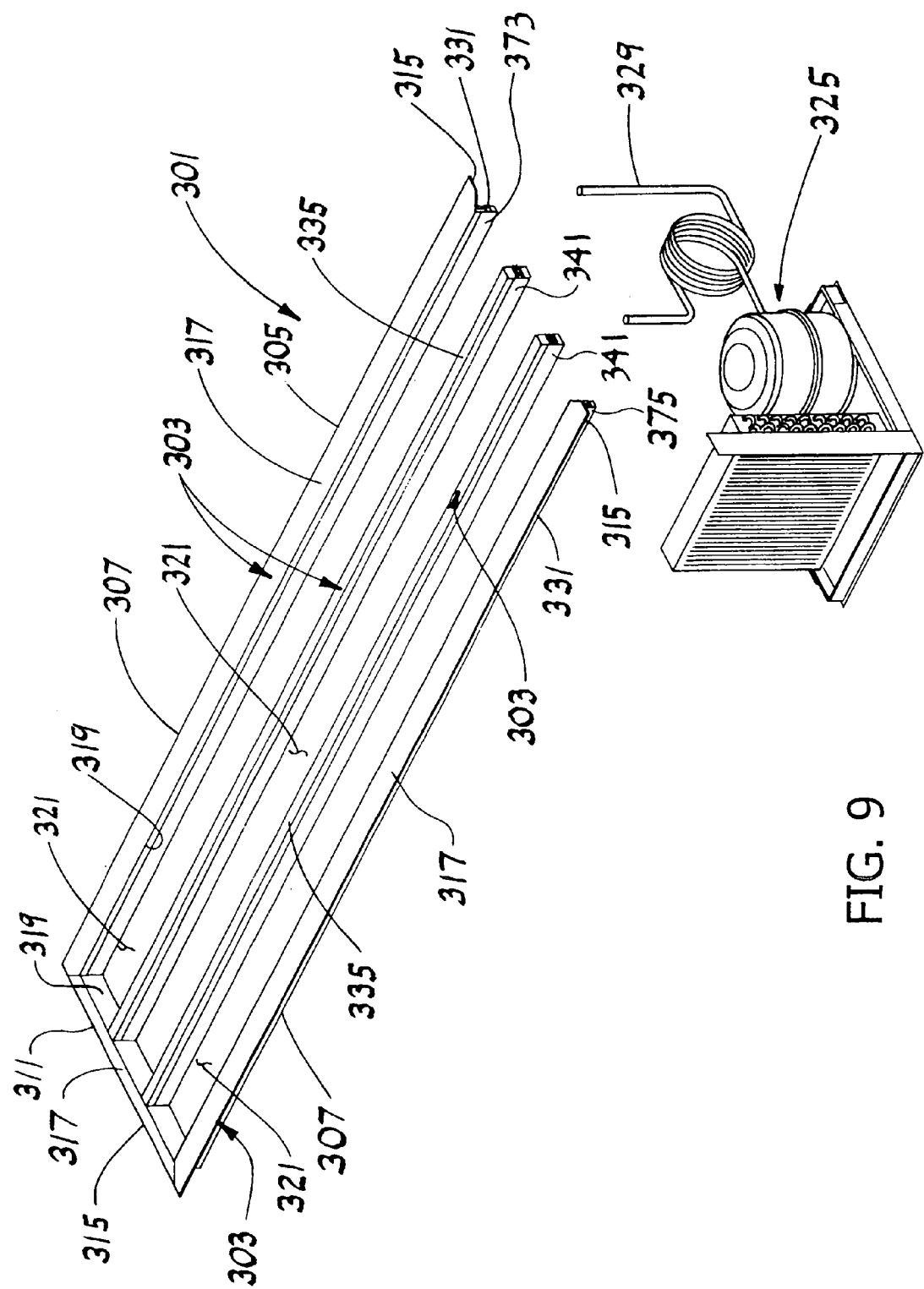
FIG. 9 is a perspective of a third embodiment of a food serving bar of the present invention.
Figure 10:
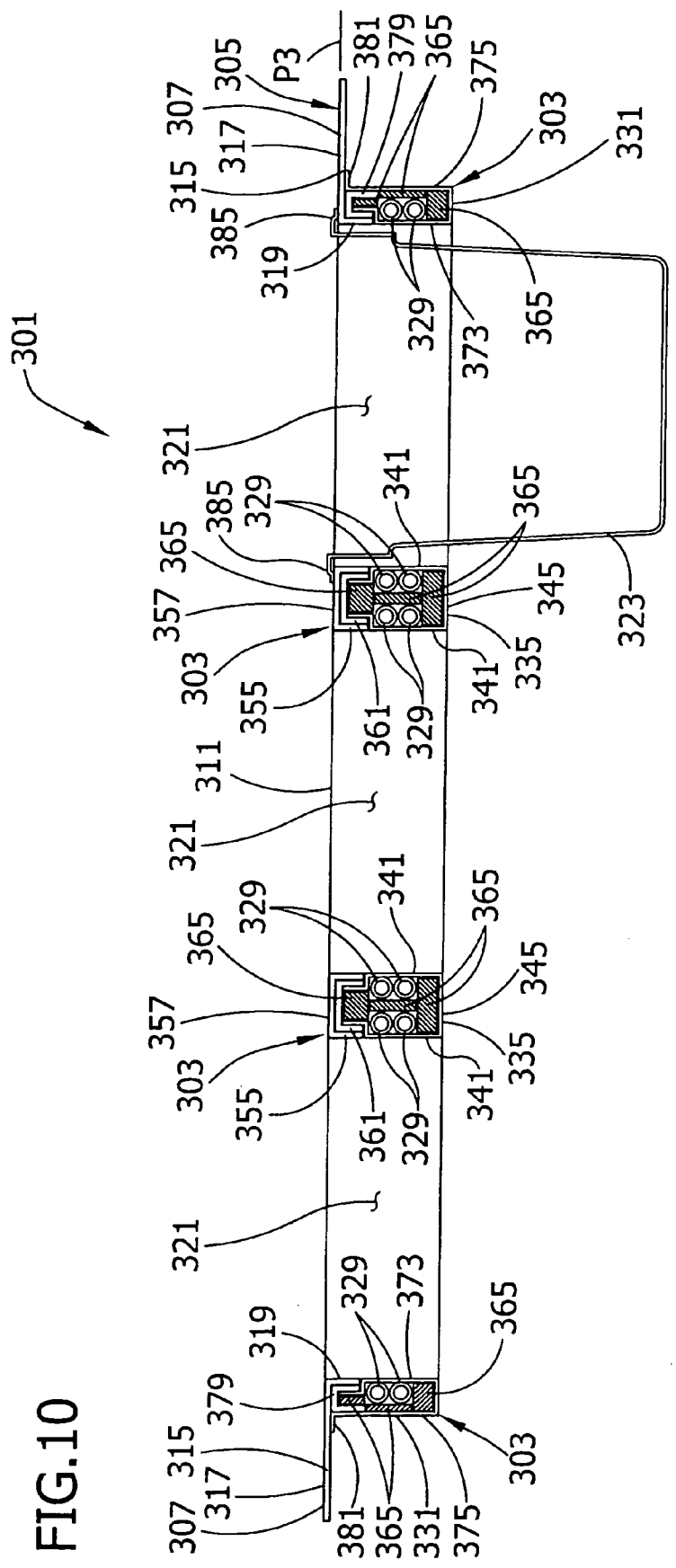
FIG. 10 is a sectional view showing a plurality of dividers and cavities in the food serving bar of FIG. 9, and a food pan in one of the cavities.

FIGS. 9–10 show a third embodiment of a food serving bar, generally designated 301, illustrated as a retrofit to an existing food serving bar such as a frost top unit of the type disclosed in U.S. Pat. No. 4,870,835. It will be understood that this embodiment 301 may also exist as a complete food serving bar incorporating the elements as described below. This design 301 comprises a plurality of dividers 303 supported by a frame 305 that is sized and shaped to fit the opening in the top wall of a food bar. In the embodiment of FIGS. 9–10, the frame 305 is generally rectangular, having a pair of parallel sides 307 and a pair of parallel ends 311, only one of which is shown. It will be understood that the frame 305 could be other shapes (e.g., square or triangular) sized to fit the opening in the top wall of the food bar. Each side 307 and end 311 comprises a horizontal flange 315 adapted to overlie the top wall of the bar and having an upward facing surface 317, and a vertical flange 319 adapted to extend down into the opening in the top wall of the bar. The horizontal flange 315 of support frame 305 may be of a suitable wear resistant material (e.g., stainless steel) to provide a durable design and attractive appearance. As in the previous embodiments, the dividers 303 define a plurality of elongate generally parallel pan receiving cavities 321 for receiving generally parallel rows of food holding pans 323 extending lengthwise of the food bar 301, one such pan being shown in FIG. 10. Also, the bar 301 includes a temperature control system, generally designated 325, and heat transfer lines 329 for cooling or heating dividers 303 and the pans 323 in a similar manner as the previous embodiments.

Referring to FIGS. 9–10, the food serving bar 301 includes four dividers 303. However, as in the previous embodiments, the number of dividers may vary. The spacing between the dividers 303 is preferably substantially the same as the spacing between the dividers 23 of FIG. 1, although this spacing may also vary. The dividers 303 of the food bar 301 are shown in the form of rails, with a pair of side rails 331 extending along opposite parallel sides 307 of the support frame 305, and two spaced-apart center rails 335 extending along the opening between the side rails. The side rails 331 and center rails 335 are secured (e.g., welded) at their front and back ends to the respective vertical flanges 319 of parallel ends 311 of the support frame 305.

Each center rail 335 has opposing side walls 341 (FIG. 10) and a bottom wall 345 defining a space which contains the heat transfer lines 329, in a similar arrangement as the previous embodiments. Each center rail 335 further comprises a stainless steel cap 355 with an upward facing surface 357 and a thermal barrier 361 below the cap bridging the opposing side walls 341 of the rail. The center rails 335 are preferably filled with strips of thermal insulation 365 that surround the heat transfer lines 329 on three sides. As in the previous embodiments, the heat transfer lines 329 are preferably in contact with respective opposing side walls 341 to cool (or heat) the side walls and the food pan 323 located nearby. Also, the caps 355 and opposing side walls 341 of each center rail 335 form a smooth, flat, continuous junction similar to the previous embodiments.

Each side rail 331 has an inner and outer side wall, 373 and 375 respectively, defining a space which contains heat transfer lines 329 and strips of thermal insulation 365 as in the previous embodiments. In the embodiment of FIGS. 9–10, the horizontal flange 315 of the support frame 305 overlies the inner and outer side walls 373, 375. A thermal barrier 379 below the horizontal flange 315 prevents frosting of the frame 305. Vertical flanges 319 of the support frame 305 mate against the thermal barrier 379 to form a smooth, flat, continuous surface with the inner side walls 373. Each outer side wall 375 has a flange 381 that is secured (e.g., welded) to horizontal flange 315. Each horizontal flange is mounted on the existing food server unit top wall (not shown) so that the upward facing surfaces 357 of caps 355 and upward facing surfaces 317 lie substantially in the same plane P3. The caps 355 and horizontal flange 315 of support frame 305 support the peripheral lips 385 of the food-holding pans 323 so that the pan is supported in the cavities 321 between adjacent rails 331, 335.

The specific dimensions of the center rails 3.35 and side rails 331 (or rail if only one is provided) will vary, depending on cooling or heating requirements. By way of example, each center rail 335 may have an overall height of about 1.7 in., a width (between side walls 341) of about 1.1 in., and a length of about 82 in., and each side rail 331 may have an overall height of about 1.7 in., a width (between inner and outer side walls 373, 375) of about 0.7 in., and a length of about 82 in.

Figure 11:
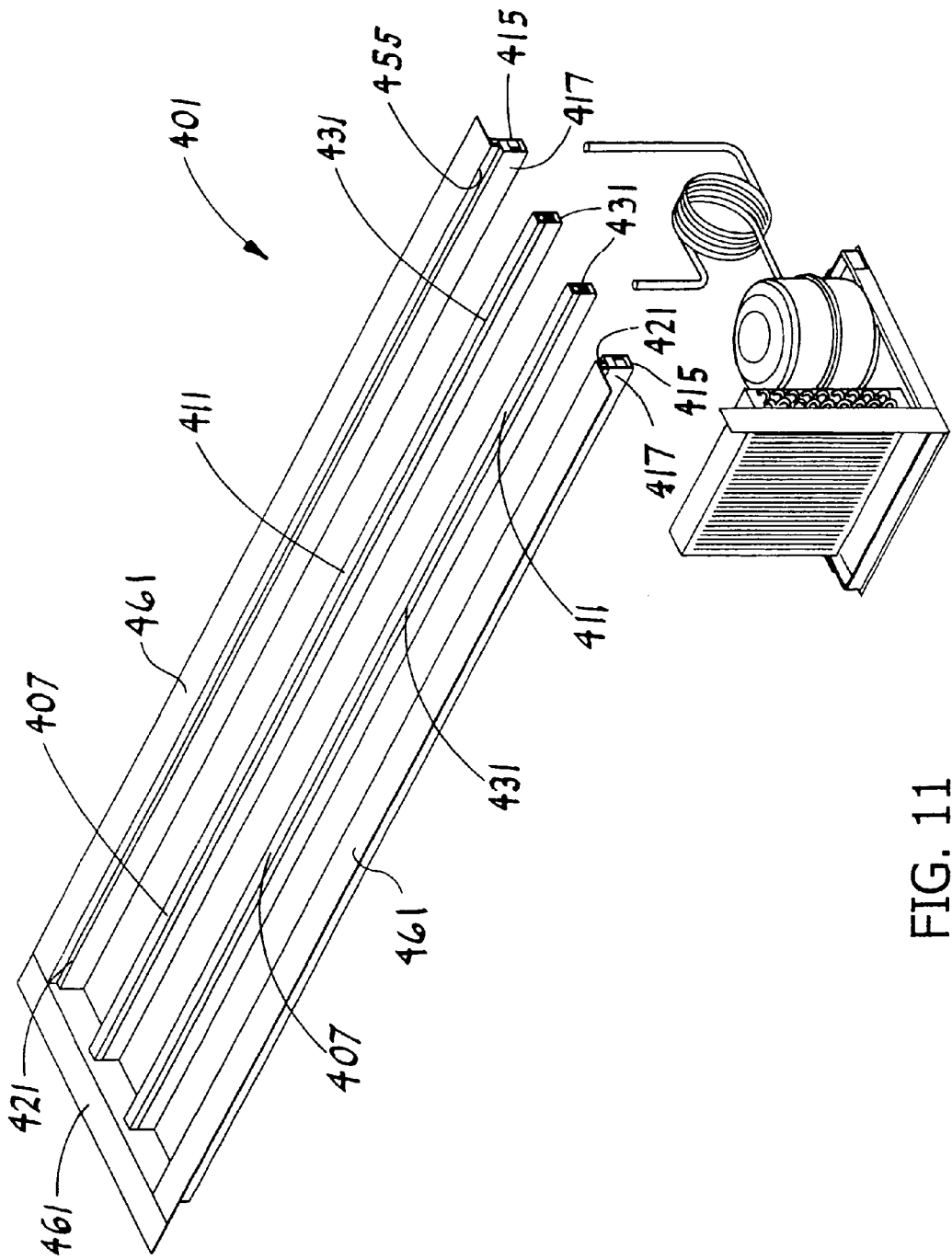
FIG. 11 is a perspective of a fourth embodiment of a food serving bar of the present invention.
Figure 12:
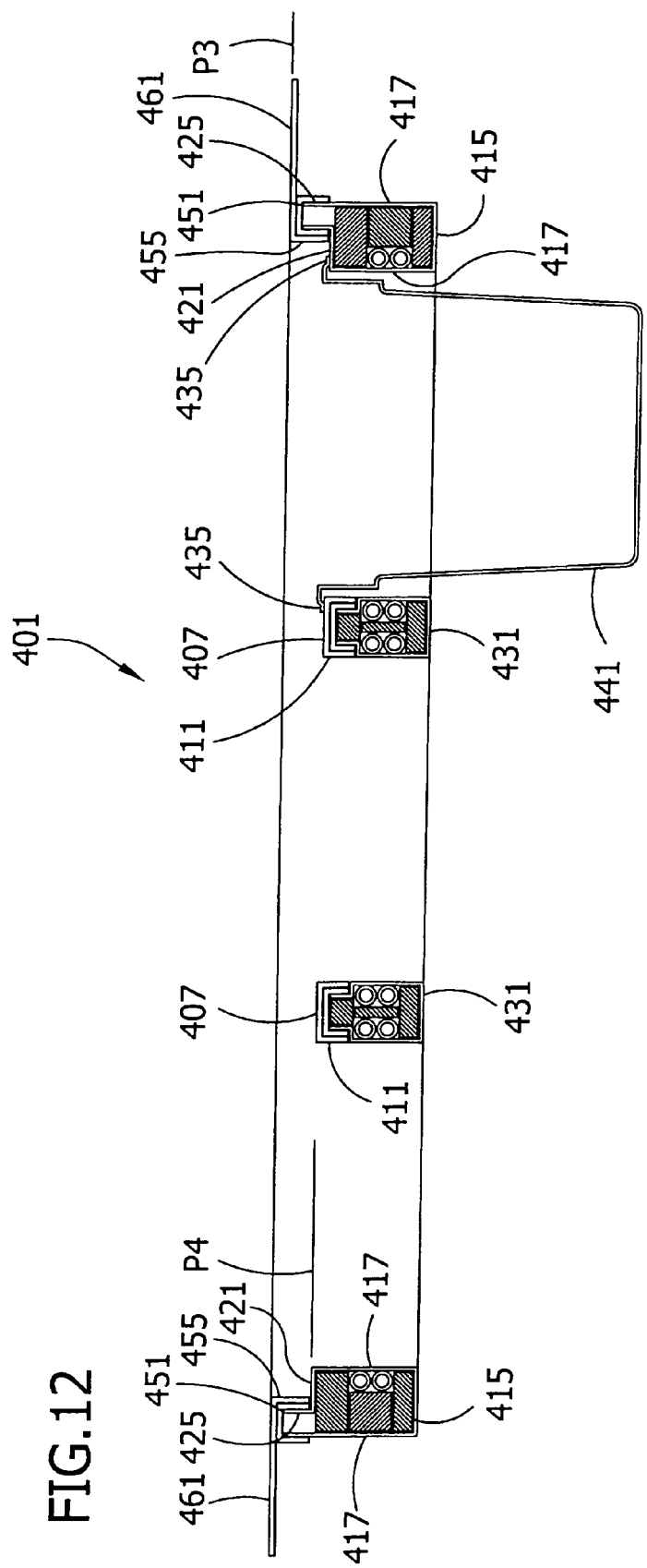
FIG. 12 is a sectional view showing a plurality of dividers and cavities in the food serving bar of FIG. 11, and a food pan in one of the cavities.

FIGS. 11–12 illustrate a fourth embodiment of a food serving bar, generally designated 401. This embodiment is substantially similar to the third embodiment, except that the upward facing surfaces 407 of the pan-supporting caps 411 are disposed in a plane P4 recessed below the plane P3 of the existing top wall of the food serving bar. The two side rails 415 have outer side walls 417 formed with generally horizontal shoulders 421 and upturned lips 425 at the outer ends of the shoulders. The shoulders 421 are generally coplanar with upward facing surfaces 407 of the pan supporting caps 411 of the center rails 431 to support the peripheral lips 435 of the food-holding pans 441. Thermal barriers 451 are positioned between the upturned lips 425 of the side rails 415 and the vertical flange 455 of the support frame 461 to prevent frosting of the frame that overlies the top wall of the cabinet (not shown).

While the food server of each of the above embodiments is preferably a cold-pan server, it will be understood, as noted earlier, that the technology of the present invention could be used for hot-pan servers. This can be achieved by using heating elements in lieu of refrigeration lines. Such elements could include, for example, heating lines through which a hot thermal fluid is circulated to heat the walls of the dividers. Electric resistance heaters could also be used to heat the dividers. In this configuration, extruded channels or other dividers could be formed to function as heat sinks, similar to the heat sinks described in co-assigned U.S. Pat. Nos. 6,262,394 and 6,175,099, both of which are incorporated herein by reference.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temperature-controlled food serving bar comprising
   a cabinet having opposite sides and opposite ends defining an elongate interior cabinet space extending endwise of the cabinet,
   at least one divider of thermally conductive material extending lengthwise of the elongate interior cabinet space and dividing the interior cabinet space into a plurality of elongate, upward-opening pan-receiving cavities each of which extends endwise of the cabinet to allow placement of at least one food-holding pan in the cavity at any desired location along the cavity, the divider comprising a side wall and a bottom wall, at least one of the bottom wall and the side wall having a wall thickness between about 0.1 inch and about 0.2 inch,
   at least one food-holding pan received in one of said pan-receiving cavities, said pan having a bottom wall and side walls,
   at least one of the side walls of the at least one food-holding pan being spaced from the side wall of the divider between about 0.03 inch and about 0.15 inch, and
   a temperature control system for controlling the temperature of the at least one divider.

2. The food serving bar set forth in claim 1 wherein said bottom wall of the food-holding pan is spaced about 0.5 inch from the bottom wall of the divider.

3. The food serving bar set forth in claim 1 wherein said at least one divider comprises a channel having two opposing side walls and a bottom wall.

4. The food serving bar set forth in claim 3 wherein said bottom wall is substantially continuous and the bottom wall and side walls of the channel combine to define one of said cavities for receiving said at least one food-holding pan therein.

5. The food serving bar set forth in claim 3 wherein said channel is a metal extrusion.

6. The serving bar set forth in claim 1 wherein said at least one divider comprises a plurality of dividers having upwardly facing surfaces for supporting food-holding pans in positions in which the pans extend down into said cavities adjacent the side walls of the dividers for being heated or cooled thereby.

7. The serving bar set forth in claim 6 further comprising thermal barriers below said upwardly facing surfaces for inhibiting the transfer of heat between the side walls of the dividers and said surfaces.

8. The serving bar set forth in claim 1 wherein each elongate cavity is undivided along an entire length of the cavity.

9. The serving bar set forth in claim 1 wherein said cavities have a width not substantially greater than the width of the food-holding pans.

10. The serving bar set forth in claim 9 wherein said cavities have a width greater than the width of the food-holding pans by a distance not greater than about 0.3 inches.

11. The serving bar set forth in claim 1 wherein said at least one food-holding pan comprises a plurality of food-holding pans.

12. The serving bar set forth in claim 1 wherein said at least one food-holding pan has a width of approximately 6.9 inches.

13. The serving bar set forth in claim 1 further comprising a liner having side walls and a bottom wall, the bottom wall of the at least one divider being spaced above the bottom wall of the liner to form an interior space.

14. The serving bar set forth in claim 13 wherein said at least one divider comprises two side walls spaced apart from the side walls of the liner to form respective outer interior spaces of the cabinet.

15. The serving bar set forth in claim 13 wherein said liner is pan-shaped and made of metal.

16. The serving bar set forth in claim 1 wherein said temperature control system comprises at least one heating element for heating the at least one divider.

17. The serving bar set forth in claim 16 wherein said at least one heating element is an electric resistance heating element generally adjacent at least one of the bottom wall and the side wall of the at least one divider.

18. A temperature-controlled food serving bar comprising
a cabinet having opposite sides and opposite ends defining an elongate interior cabinet space extending endwise of the cabinet,
at least one channel of thermally conductive material extending lengthwise of the elongate interior cabinet space and dividing the interior cabinet space into a plurality of elongate, upward-opening pan-receiving cavities each of which extends endwise of the cabinet to allow placement of at least one food-holding pan in the cavity at any desired location along the cavity, the channel having opposing side walls and a bottom wall, at least one of the bottom wall and the side wall having a wall thickness between about 0.1 inch and about 0.2 inch,
a liner having side walls and a bottom wall, the bottom wall of the at least one channel being spaced above the bottom wall of the liner to form an interior space,
a plurality of food-holding pans received in one of said pan-receiving cavities, at least one of said pans having a bottom wall, side walls, and a width of approximately 6.9 inches,
the side walls of said at least one of the food-holding pans being spaced from a respective side wall of the channel between about 0.03 inch and about 0.15 inch, and
a temperature control system for heating the at least one channel.

19. A retrofit kit for installation on an existing food serving bar cabinet having opposite sides and opposite ends defining an elongate interior cabinet space extending endwise of the cabinet, the retrofit kit comprising
at least one divider of thermally conductive material for placement in the cabinet to extend lengthwise of the elongate interior cabinet space, said divider having opposed side walls for extending down into said interior cabinet space and a bottom wall to divide said interior cabinet space into a plurality of elongate upward-opening pan-receiving cavities each of which extends endwise of the cabinet to allow placement of multiple food-holding pans in the cavity at any desired location along the cavity, at least one of the side walls and bottom wall having a wall thickness between about 0.1 inch and about 0.2 inch,
at least one food-holding pan received in one of said pan-receiving cavities, said pan having a bottom wall and side walls,
at least one of the side walls of the at least one food-holding pan being spaced from the side wall of the divider between about 0.03 inch and about 0.15 inch, and
a temperature control system for controlling the temperature of the at least one divider.

20. The retrofit kit set forth in claim 19 wherein said at least one divider comprises a channel having two opposing side walls and a bottom wall.

21. The retrofit kit set forth in claim 20 wherein said channel is a metal extrusion.

22. The retrofit kit set forth in claim 19 wherein the temperature control system comprises at least one electric resistance heating element for heating said at least one divider.

23. A temperature-controlled food serving bar comprising
a cabinet having opposite sides and opposite ends defining an elongate interior cabinet space extending endwise of the cabinet,
a plurality of generally parallel dividers of thermally conductive material extending lengthwise of the elongate interior cabinet space and dividing the interior cabinet space into a plurality of elongate, upward-opening pan-receiving cavities each of which extends endwise of the cabinet to allow placement of multiple food-holding pans in the cavity at any desired location along the cavity,
each divider of said plurality of dividers having generally parallel, closely spaced divider side walls defining a narrow, elongate interior divider space between the divider side walls,
a plurality of food-holding pans received in each pan-receiving cavity, at least one or more of said pans, when received in a respective pan-receiving cavity, having a side disposed closely adjacent a side wall of one of said plurality of dividers and an opposite side disposed closely adjacent a side wall of another of said plurality of dividers, and
a temperature control system for controlling the temperature of said plurality of dividers.

24. The serving bar set forth in claim 23 wherein said plurality of dividers comprises at least one rail defining said elongate interior divider space.

25. The serving bar set forth in claim 24 further comprising one or more heat transfer lines in said interior divider space.

26. The serving bar set forth in claim 24 wherein said at least one rail is a metal extrusion.

27. The serving bar set forth in claim 23 wherein each pan-receiving cavity is undivided along an entire length of the cavity.

28. The serving bar set forth in claim 27 wherein said pan-receiving cavities have a width not substantially greater than the width of the food-holding pans.

29. The serving bar set forth in claim 28 wherein said pan-receiving cavities have a width greater than the width of the food-holding pans by a distance not greater than about 0.3 inches.

30. The serving bar set forth in claim 23 wherein at least one of said plurality of food-holding pans has a width of approximately 6.9 inches.

31. The serving bar set forth in claim 23 wherein said temperature control system comprises an electric resistance heating element for heating at least one of said plurality of dividers.

32. A temperature-controlled food serving bar comprising
a cabinet having opposite sides and opposite ends defining an elongate interior cabinet space extending endwise of the cabinet,
at least one divider of thermally conductive material extending lengthwise of the elongate interior cabinet space and dividing the interior cabinet space into a plurality of elongate, upward-opening pan-receiving cavities each of which extends endwise of the cabinet to allow placement of multiple food- holding pans in the cavity at any desired location along the cavity, and
a temperature control system for controlling the temperature of said at least one divider to heat or cool said food-holding pans in said cavities.

33. The serving bar set forth in claim 32 wherein said at least one divider comprises a rail having opposing rail side walls defining an elongate interior divider space between the rail side walls.

34. The serving bar set forth in claim 33 further comprising one or more heat transfer lines in said interior divider space.

35. A serving bar according to claim 32 wherein said at least one divider comprises a channel having two opposing channel side walls and a bottom wall combining to define one of said pan-receiving cavities for receiving multiple food-holding pans therein.

36. The serving bar set forth in claim 32, wherein said at least one divider comprises a plurality of dividers having upwardly facing surfaces for supporting food-holding pans in positions in which the pans extend down into said cavities adjacent side walls of the dividers for being heated or cooled thereby.

37. The serving bar set forth in claim 36 further comprising thermal barriers below said upwardly facing surfaces for inhibiting the transfer of heat between the side walls of the dividers and said upwardly facing surfaces.

38. The serving bar set forth in claim 32 wherein said temperature control system is free of heat transfer lines extending transversely across the cavities at locations corresponding to locations between adjacent pans in the cavities.

39. The serving bar set forth in claim 32 wherein said temperature control system comprises a plurality of heat transfer lines forming separate heat transfer coils surrounding respective cavities for controlling the temperature of respective cavities.

* * * * *